United States Patent [19]
Owens et al.

[11] Patent Number: 6,030,934
[45] Date of Patent: Feb. 29, 2000

[54] AZEOTROPIC COMPOSITIONS OF METHOXY-PERFLUOROPROPANE AND THEIR USE

[75] Inventors: John G. Owens, Woodbury; Philip E. Tuma, St. Paul, both of Minn.; Hideto Yanome, Kanagawa, Japan

[73] Assignee: 3M Innovative Properties Company, St. Paul, Minn.

[21] Appl. No.: 08/936,582

[22] Filed: Sep. 24, 1997

Related U.S. Application Data

[63] Continuation-in-part of application No. 08/802,830, Feb. 19, 1997, abandoned.

[51] Int. Cl.[7] .............................. C11D 7/26; C11D 7/30; C11D 7/50; C09K 5/04
[52] U.S. Cl. .......................... 510/411; 106/311; 134/42; 252/67; 252/364; 510/177
[58] Field of Search .................... 510/411, 408, 510/177; 252/67, 364; 134/42; 106/311

[56] References Cited

U.S. PATENT DOCUMENTS

| | | | |
|---|---|---|---|
| 2,999,815 | 9/1961 | Eiseman, Jr. | 252/171 |
| 2,999,817 | 9/1961 | Bower | 252/172 |
| 3,900,372 | 8/1975 | Childs et al. | 204/81 |
| 3,903,009 | 9/1975 | Bauer et al. | 252/171 |
| 3,903,012 | 9/1975 | Brandreth | 252/194 |
| 5,023,009 | 6/1991 | Merchant | 252/171 |
| 5,064,560 | 11/1991 | Merchant | 252/171 |
| 5,125,978 | 6/1992 | Flynn et al. | 134/2 |
| 5,137,932 | 8/1992 | Behme et al. | 521/131 |
| 5,264,462 | 11/1993 | Hodson et al. | 521/88 |
| 5,275,669 | 1/1994 | Van Der Puy et al. | 134/42 |
| 5,466,877 | 11/1995 | Moore | 562/852 |
| 5,672,307 | 9/1997 | Shin et al. | 264/205 |
| 5,713,211 | 2/1998 | Sherwood | 62/114 |
| 5,756,002 | 5/1998 | Chen et al. | 252/364 |

FOREIGN PATENT DOCUMENTS

| | | | |
|---|---|---|---|
| 2098057 | 12/1993 | Canada . | |
| 0450855 | 10/1991 | European Pat. Off. . | |
| 2.287.432 | 5/1976 | France | C07C 43/12 |
| 1 294 949 | 5/1969 | Germany . | |
| 8-259930 | 8/1996 | Japan | C90K 5/04 |
| 8-257930 | 10/1996 | Japan . | |
| 8-269443 | 10/1996 | Japan . | |
| 8-327848 | 11/1996 | Japan . | |
| 2274462 | 7/1997 | United Kingdom | C09K 5/04 |
| WO 93/11201 | 6/1993 | WIPO | C09K 5/04 |
| WO 95/32935 | 12/1995 | WIPO | C07C 17/87 |
| 96/22356 | 7/1996 | WIPO . | |
| WO 96/22129 | 7/1996 | WIPO | A62D 1/00 |
| WO 96/22356 | 7/1996 | WIPO | C11D 7/50 |
| WO 97/14762 | 4/1997 | WIPO | C09K 5/00 |

OTHER PUBLICATIONS

Boiling point of cyclohexane, Handbook of Chemistry and Physics, 55th Edition, p. C–254, no month available 1975.
P. S. Zurer, "Looming Ban on Production of CFCs, Halons Spurs Switch to Substitutes," *Chemical & Engineering News*, p. 12, Nov. 15, 1993.
M. C. Sneed et al., *Comprehensive Inorganic Chemistry*, vol. 6, pp. 61–64, D. Van Nostrand Company, Inc., New York (1957) no month available.
H. Kobler et al. in *Justus Liebigs Ann. Chem.*, 1978, P1937. no month available.
S. Misaki et al., International Conference On Ozone protection Technologies, Conference Proceedings, Oct. 21–23, 1996, Washington, D.C.

*Primary Examiner*—Christine Skane
*Attorney, Agent, or Firm*—Kent S. Kokko

[57] ABSTRACT

The present invention provides binary azeotropic composition consisting essentially of $C_3F_7$—$OCH_3$ and a second component selected from the group consisting of an unsubstituted alkane having 5 to 7 carbon atoms, methyl formate, acetone, methanol, 1,1,1,3,3,3-hexafluoro-2-propanol, methylene chloride and trans-1,2-dichloroethylene. The present invention also discloses tertiary azeotropic composition consisting essentially of $C_3F_7$—$OCH_3$, a second component selected from the group consisting of methanol and 1,1,1,3,3,3-hexafluoro-2-propanol and a third component selected from the group consisting of methylene chloride and trans-1,2-dichloroethylene. The azeotropic composition of this invention may be used in various applications and in particular as refrigerant, in cleaning applications, in heat transfer applications, in coating applications, and the like.

8 Claims, 1 Drawing Sheet

മ്പ6,030,934

AZEOTROPIC COMPOSITIONS OF METHOXY-PERFLUOROPROPANE AND THEIR USE

CROSS-REFERENCE TO RELATED APPLICATIONS

This is a continuation-in-part of application Ser. No. 08/802,830 filed Feb. 19, 1997 now abandoned.

FIELD OF THE INVENTION

The present invention relates to binary and ternary azeotropic compositions comprising methoxy-perfluoropropane. The invention further relates to the use of these azeotropic compositions as CFC replacements in various application such as e.g. cleaning of substrates, as deposit of coatings and transfer of thermal energy.

BACKGROUND OF THE INVENTION

Chlorofluorocarbons (CFCs) and hydrochlorofluorocarbons (HCFCs) have been used in a wide variety of solvent applications such as drying, cleaning (e.g., the removal of flux residues from printed circuit boards), and vapor degreasing. Such materials have also been used in refrigeration, as blowing agents and in heat transfer processes.

For example, polyurethane and polyisocyanurate foams have been produced using trichlorofluoromethane (CFC-11), as the blowing agent of choice. Phenolic foams have heretofore generally been expanded with blends of trichlorofluoromethane (CFC-11) and 1,1,2-trichlorotrifluoroethane (CFC-113) blowing agents. Thermoplastic foams are usually expanded with dichlorodifluoromethane (CFC-12).

Further, many smaller scale hermetically sealed, refrigeration systems, such as those used in refrigerators or window and auto air conditioners, use dichlorodifluoromethane (CFC-12) as the refrigerant. Larger scale centrifugal refrigeration equipment, such as those used for industrial scale cooling, e.g., commercial office buildings, generally employ trichlorofluoromethane (CFC-11), dichlorodifluoromethane (CFC-12) or 1,1,2-trichlorotrifluoroethane (CFC-113) as the refrigerants of choice.

Aerosol products have employed both individual halocarbons and halocarbon blends as propellant systems. Halocarbons have also been used both as solvents and propellant vapor pressure attenuators, in aerosol systems.

While these materials were initially believed to be environmentally-benign, they have now been linked to ozone depletion. According to the Montreal Protocol and its attendant amendments, production and use of CFCs must be discontinued (see, e.g., P. S. Zurer, "Looming Ban on Production of CFCs, Halons Spurs Switch to Substitutes," *Chemical & Engineering News*, page 12, Nov. 15, 1993).

The characteristics sought in replacements, in addition to low ozone depletion potential, typically have included boiling point ranges suitable for a variety of solvent cleaning applications, low flammability, and low toxicity. Solvent replacements also should have the ability to dissolve both hydrocarbon-based and fluorocarbon-based soils. Preferably, substitutes will also be low in toxicity, have no flash points (as measured by ASTM D3278-89), have acceptable stability for use in cleaning applications, and have short atmospheric lifetimes and low global warming potentials.

Certain perfluorinated (PFCs) and highly fluorinated hydrofluorocarbon (HFCs) materials have also been evaluated as CFC and HCFC replacements in solvent applications. While these compounds are generally sufficiently chemically stable, nontoxic and nonflammable to be used in solvent applications, PFCs tend to persist in the atmosphere, and PFCs and HFCs are generally less effective than CFCs and HCFCs for dissolving or dispersing hydrocarbon materials. Also, mixtures of PFCs or HFCs with hydrocarbons tend to be better solvents and dispersants for hydrocarbons than PFCs or HFCs alone.

Hydrofluorocarbon ethers (HFE) have also been evaluated as CFC replacements in certain applications. For example RITE in the Conference Proceedings of the International CFC and Halon Alternatives Conference, Oct. 24–26, 1994 discloses several hydrofluorocarbon ethers as possible CFC replacements and discusses various properties of these compounds. Methoxy-perfluoropropane was mentioned amongst the many hydrofluorocarbon ethers in this disclosure. WO96/22356 discloses HFEs for use in cleaning of substrate surfaces. WO96/22356 mentions methoxy-perfluoropropane and optional mixtures thereof with various solvents. WO96/22129 mentions the use of HFEs and in particular methoxy-perfluoropropane in fire extinguishing compositions. Published Japanese Patent Application (Kokkai) 8-259930 discloses the use of perfluoropropyl methyl ether as a transport fluid.

While HFEs are excellent candidates as CFC and HCFC replacements, they may not always have all the desired properties for particular applications. For example, in replacing a CFC as a refrigerant, an HFE may not have sufficient solvency for lubricants that are generally admixed with the CFC. Accordingly, mixtures of HFEs with other organic components are being considered. Such mixtures are preferably azeotropic compositions.

Many azeotropes possess properties that make them useful as CFC and HCFC replacements. For example, azeotropes have a constant boiling point, which avoids boiling temperature drift during processing and use. In addition, when a volume of an azeotrope is used as a solvent, the properties of the solvent remain constant because the composition of the solvent in the vapor phase does not change. Azeotropes that are used as solvents also can be recovered conveniently by distillation.

For example, WO93/11201 discloses azeotropic compositions of hydrofluorocarbons and hydrofluorethers as refrigerants. U.S. Pat. No. 5,023,009 discloses binary azeotropic compositions of 1,1,1,2,3,3-hexafluoro-3-methoxypropane and 2,2,3,3,3-pentafluoropropanol-1.

Azeotropic compositions that involve one or more CFCs also have been considered to tailor properties of CFCs for particular demands in some applications. For example: U.S. Pat. No. 3,903,009 discloses the ternary azeotrope of 1,1,2-trichlorotrifluorethane with ethanol and nitromethane; U.S. Pat. No. 2,999,815 discloses the binary azeotrope of 1,1,2-trichlorofluoroethane and acetone; U.S. Pat. No. 2,999,817 discloses the binary azeotrope of 1,1,2-trichlorotrifluoroethane and methylene chloride.

Despite the fact that many azeotropes are known in the art, there continues to be a further need for azeotropic compositions which have desirable end-use characteristics. Unfortunately, as recognized in the art, it is in most cases not possible reliably to predict the formation of azeotropes, a fact complicating the search for new azeotropic compositions.

SUMMARY OF THE INVENTION

The present invention provides an azeotropic composition consisting essentially of $C_3F_7$—$OCH_3$ and a second component selected from the group consisting of an unsubstituted alkane having 5 to 7 carbon atoms, methyl formate, acetone, methanol, 1,1,1,3,3,3-hexafluoro-2-propanol, methylene chloride and trans-1,2-dichloroethylene.

The present invention further provides an azeotropic composition consisting essentially of $C_3F_7$—$OCH_3$, a second component selected from the group consisting of methanol and 1,1,1,3,3,3-hexafluoro-2-propanol and a third component selected from the group consisting of methylene chloride and trans-1,2-dichloroethylene.

In a still further aspect, the present invention relates to a process for producing refrigeration which comprises evaporating an azeotropic composition as defined above in the vicinity of a body to be cooled.

Further, the present invention relates to a process for producing heat which comprises condensing an azeotropic composition as defined above in the vicinity of a body to be heated.

Further, the present invention provides a process for transferring heat comprising employing an azeotropic composition as above defined as a secondary loop refrigerant.

The present invention also provides a process for cleaning a solid surface which comprises contacting said solid surface with an azeotropic composition as defined above.

Further provided is a process for depositing a coating on a substrate surface comprising the steps of applying to the substrate surface a liquid coating composition comprising an azeotropic mixture as defined above and a coating material that is soluble or dispersible in the azeotropic composition and further evaporating the azeotropic composition.

This invention further relates to a composition comprising an azeotropic mixture as defined above and a material, in particular a coating material, that is soluble or dispersible in said azeotropic composition.

This invention also provides a spray comprising an azeotropic composition.

DETAILED DESCRIPTION OF PREFERRED EMBODIMENTS

Figure 1:
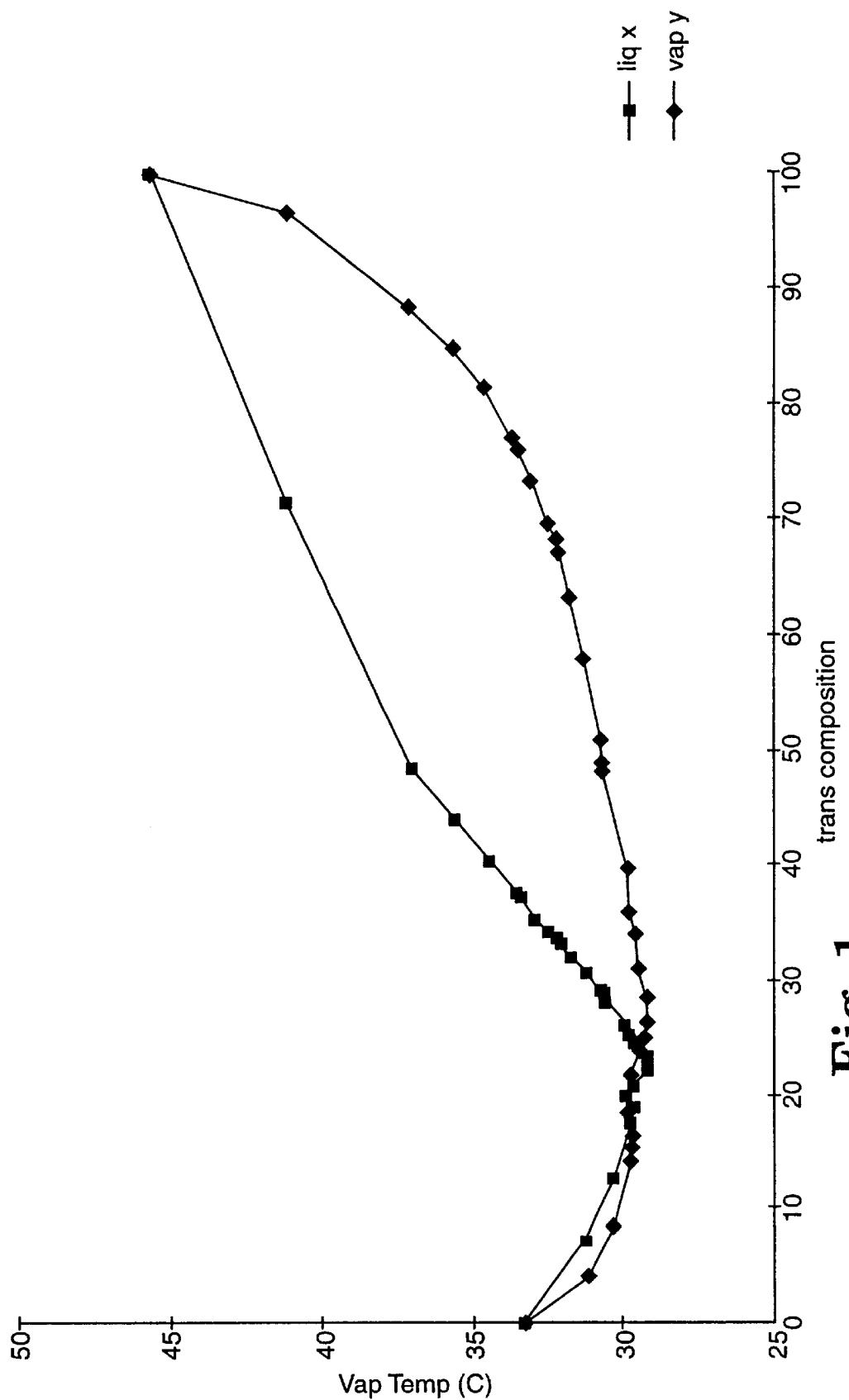
FIG. 1 represents a vapor-liquid equilibrium curve for a methoxy-perfluoropropane/trans1,2-dichloroethylene system at atmospheric pressure.

The term "azeotropic compositions" in connection with this invention includes both the azeotrope and compositions that behave essentially like an azeotrope in that they boil at substantially the same temperature as the corresponding azeotrope. Preferably, the boiling point of an azeotropic composition at ambient pressure is within about 1° C. of the boiling point of its azeotrope measured at the same pressure. More preferably, the azeotropic compositions will boil at temperatures that are within about 0.5° C. of the boiling points of their corresponding azeotropes. It will be understood that the concentrations of the hydrofluorocarbon ether and organic solvent in a particular azeotropic composition may vary substantially from the amounts contained in the composition's corresponding azeotrope, and the magnitude of such permissible variation depends upon the organic solvent used to make the composition. Preferably, the concentrations of hydrofluorocarbon ether and organic solvent in an azeotropic composition vary no more than about ten percent from the concentrations of such components contained in the azeotrope formed between them at ambient pressure. More preferably, the concentrations are within about five percent of those contained in the azeotrope. Most preferably, the azeotropic composition contains essentially the same concentrations of the ether and solvent as are contained in the azeotrope formed between them at ambient pressure. Where the concentrations of ether and organic solvent in an azeotropic composition differ from the concentrations contained in the corresponding azeotrope, the preferred compositions contain a concentration of the ether that is in excess of the ether's concentration in the azeotrope. Such compositions are likely to be less flammable than azeotropic compositions in which the organic solvent is present in a concentration that is in excess of its concentration in the azeotrope.

The azeotropic composition of the present invention can be used as a replacement for CFCs and HCFCs in a variety of applications in which CFCs and HCFCs have traditionally been employed. In particular, azeotropic compositions in accordance with the present invention are suitable candidates for the replacement of CFC-11 and/or CFC-113. In particular, the azeotropic compositions may be used in cleaning, in heat transfer processes, as refrigerants, as a reaction medium, as a blowing agent, as a coating liquid, and the like.

The azeotropic compositions according to this invention are mixtures of hydrofluorocarbon ether and second and optionally third component which, if fractionally distilled, produce a distillate fraction that is an azeotrope of the hydrofluorocarbon ether and the second and optionally third component. The azeotropic compositions boil at temperatures that are essentially the same as the boiling points of their corresponding azeotropes. Preferably, the boiling point of an azeotropic composition at ambient pressure is within about 1° C. of the boiling point of its corresponding azeotrope measured at the same pressure. More preferably, the azeotropic compositions will boil at temperatures that are within about 0.5° C. of the boiling points of their corresponding azeotropes. The concentrations of the hydrofluorocarbon ether and second and optionally third component in a particular azeotropic composition may vary substantially from the amounts contained in the composition's corresponding azeotrope, and the magnitude of such permissible variation depends upon the second and optionally third component used to make the azeotropic composition. Preferably, the concentrations of hydrofluorocarbon ether and second and optionally third component in an azeotropic composition vary no more than about ten percent from the concentrations of such components contained in the azeotrope formed between them at ambient pressure. More preferably, the concentrations are within about five percent of those contained in the azeotrope. Most preferably, the azeotropic composition contains essentially the same concentrations of the ether and second and optionally third component as are contained in the azeotrope formed between them at ambient pressure. Where the concentrations of ether and second and optionally third component in an azeotropic composition differ from the concentrations contained in the corresponding azeotrope, the preferred compositions contain a concentration of the ether that is in excess of the ether's concentration in the azeotrope. Such compositions are likely to be less flammable than azeotropic compositions in which the second and optionally third component is present in a concentration that is in excess of its concentration in the azeotrope. The most preferred azeotropic compositions will exhibit no significant change in the solvent power of the compositions over time.

The language "consisting of" used in describing the azeotropic compositions of the invention is not intended to exclude the presence of minor amounts of other materials which do not significantly alter the azeotropic behavior of the composition. Accordingly, the azeotropic compositions of this invention may also contain, in addition to the hydrofluorocarbon ether and second and optionally third component, small amounts of other compounds which do not interfere in the formation of the azeotrope. For example, small amounts of surfactants may be present in the azeotropic compositions of the invention to improve the dispersibility or solubility of materials, such as water or coating materials (e.g., perfluoropolyether lubricants and fluoropolymers), in the azeotropic composition.

The characteristics of azeotropes are discussed in detail in Merchant, U.S. Pat. No. 5,064,560 (see, in particular, col. 4, lines 7–48).

The hydrofluorocarbon ether used in the present invention is $C_3F_7$—$OCH_3$ and includes the pure isomers n-$C_3F_7$—$OCH_3$ and $CF_3$—$CF(OCH_3)$—$CF_3$ (=i—$C_3F_7$—$OCH_3$) as well as mixtures of these isomers. Most preferred in the present invention is pure n-$C_3F_7$—$OCH_3$.

The hydrofluorocarbon ether can be prepared by alkylation of perfluorinated alkoxides prepared by the reaction of the corresponding perfluorinated acyl fluoride or perfluorinated ketone with any suitable source of anhydrous fluoride ion such as anhydrous alkali metal fluoride (e.g., potassium fluoride or cesium fluoride) or anhydrous silver fluoride in an anhydrous polar, aprotic solvent in the presence of a quaternary ammonium compound such as "ADOGEN 464" available from the Aldrich Chemical Company. General preparative methods for the ethers are also described in French Patent No. 2,287,432, German Patent No. 1,294,949, and in Assignee's co-pending application titled "Process for Production of Hydrofluoroethers," U.S. Ser. No. 08/632,697.

Suitable alkylating agents for use in the preparation include dimethyl sulfate, methyl iodide, methyl p-toluenesulfonate, methyl perfluoromethanesulfonate and the like. Suitable polar, aprotic solvents include acyclic ethers such as diethyl ether, ethylene glycol dimethyl ether, and diethylene glycol dimethyl ether; carboxylic acid esters such as methyl formate, ethyl formate, methyl acetate, diethyl carbonate, propylene carbonate, and ethylene carbonate; alkyl nitriles such as acetonitrile; alkyl amides such as N,N-dimethylformamide, N,N-diethylformamide, and N-methylpyrrolidone; alkyl sulfoxides such as dimethyl sulfoxide; alkyl sulfones such as dimethylsulfone, tetramethylene sulfone, and other sulfolanes; oxazolidones such as N-methyl-2-oxazolidone; and mixtures thereof.

Perfluorinated acyl fluorides (for use in preparing the hydrofluorocarbon ether) can be prepared by electrochemical fluorination (ECF) of the corresponding hydrocarbon carboxylic acid (or a derivative thereof), using either anhydrous hydrogen fluoride (Simons ECF) or KF.2HF (Phillips ECF) as the electrolyte. Perfluorinated acyl fluorides and perfluorinated ketones can also be prepared by dissociation of perfluorinated carboxylic acid esters (which can be prepared from the corresponding hydrocarbon or partially-fluorinated carboxylic acid esters by direct fluorination with fluorine gas). Dissociation can be achieved by contacting the perfluorinated ester with a source of fluoride ion under reacting conditions (see the methods described in U.S. Pat. No. 3,900,372 (Childs) and U.S. Pat. No. 5,466,877 (Moore), the description of which is incorporated herein by reference) or by combining the ester with at least one initiating reagent selected from the group consisting of gaseous, non-hydroxylic nucleophiles; liquid, non-hydroxylic nucleophiles; and mixtures of at least one non-hydroxylic nucleophile (gaseous, liquid, or solid) and at least one solvent which is inert to acylating agents.

Initiating reagents which can be employed in the dissociation are those gaseous or liquid, non-hydroxylic nucleophiles and mixtures of gaseous, liquid, or solid, non-hydroxylic nucleophile(s) and solvent (hereinafter termed "solvent mixtures") which are capable of nucleophilic reaction with perfluorinated esters. The presence of small amounts of hydroxylic nucleophiles can be tolerated. Suitable gaseous or liquid, non-hydroxylic nucleophiles include dialkylamines, trialkylamines, carboxamides, alkyl sulfoxides, amine oxides, oxazolidones, pyridines, and the like, and mixtures thereof. Suitable non-hydroxylic nucleophiles for use in solvent mixtures include such gaseous or liquid, non-hydroxylic nucleophiles, as well as solid, non-hydroxylic nucleophiles, e.g., fluoride, cyanide, cyanate, iodide, chloride, bromide, acetate, mercaptide, alkoxide, thiocyanate, azide, trimethylsilyl difluoride, bisulfite, and bifluoride anions, which can be utilized in the form of alkali metal, ammonium, alkyl-substituted ammonium (mono-, di-, tri-, or tetra-substituted), or quaternary phosphonium salts, and mixtures thereof. Such salts are in general commercially available but, if desired, can be prepared by known methods, e.g., those described by M. C. Sneed and R. C. Brasted in *Comprehensive Inorganic Chemistry*, Volume Six (The Alkali Metals), pages 61–64, D. Van Nostrand Company, Inc., New York (1957), and by H. Kobler et al. in *Justus Liebigs Ann. Chem.*, 1978, 1937. 1,4-diazabicyclo [2.2.2]octane and the like are also suitable solid nucleophiles.

The hydrofluorocarbon ethers used to prepare the azeotropic compositions of this invention do not deplete the ozone in the earth's atmosphere and have surprisingly short atmospheric lifetimes thereby minimizing their impact on global warming. Reported in Table 1 is an atmospheric lifetime for the hydrofluorocarbon ether which was reported by S. Misaki and A. Sekiya at the International Conference On Ozone Protection Technologies, Conference Proceedings, Oct. 21–23, 1996, Washington, D.C . It is apparent from the data in Table 1 that the hydrofluorocarbon ether has a relatively short estimated atmospheric lifetime and relatively small global warming potential. Surprisingly, the hydrofluorocarbon ether also has a significantly shorter estimated atmospheric lifetime than its corresponding hydrofluorocarbon alkane.

TABLE 1

| Compound | Atmospheric Lifetime (years) | Global Warming Potential (100 year ITH) |
| --- | --- | --- |
| n-$C_3F_7$-$OCH_3$ | 6.4 | 485 |
| i-$C_3F_7$-$OCH_3$ | 4.9 | 368 |

The present invention provides both binary as well as ternary azeotropic composition of the hydrofluorocarbon ether. Suitable second components that can form binary azeotropic compositions with the hydrofluorocarbon ether are unsubstituted alkanes having 5 to 7 carbon atoms, methyl formate, acetone, methanol, 1,1,1,3,3,3-hexafluoro-2-propanol, methylene chloride and trans-1,2-dichloroethylene. Particularly suitable unsubstituted alkanes are n-pentane, n-hexane, methylcyclopentane, 2,2-dimethylbutane, cyclohexane and n-heptane.

Specific azeotropic compositions in accordance with the invention include:

(A) a composition consisting essentially of 69–72 weight percent n-$C_3F_7$—$OCH_3$ and 28–31 weight percent n-pentane and having a boiling point of 24.8° C.±1° C. at a pressure of 735.8 mm Hg;

(B) a composition consisting essentially of 82–84 weight percent n-C$_3$F$_7$—OCH$_3$ and 16–18 weight percent 2,2-dimethylbutane and having a boiling point of 30.6° C.±1° C. at a pressure of 735.6 mm Hg;

(C) a composition consisting essentially of 96.1–96.5 weight percent n-C$_3$F$_7$—OCH$_3$ and 3.5–3.9 weight percent n-hexane and having a boiling point of 32.7° C.±1° C. at a pressure of 729.6 mm Hg;

(D) a composition consisting essentially of 95.8–96.2 weight percent n-C$_3$F$_7$—OCH$_3$ and 3.8–4.2 weight percent methylcyclopentane and having a boiling point of 32.9° C.±1° C. at a pressure of 729.5 mm Hg;

(E) a composition consisting essentially of 97.4–97.7 weight percent n-C$_3$F$_7$—OCH$_3$ and 2.3–2.6 weight percent cyclohexane and having a boiling point of 33.3° C.±1° C. at a pressure of 735.8 mm Hg;

(F) a composition consisting essentially of 99.2–99.8 weight percent n-C$_3$F$_7$—OCH$_3$ and 0.37–0.41 weight percent n-heptane and having a boiling point of 33.4° C.±1° C. at a pressure of 729.3 mm Hg;

(G) a composition consisting essentially of 66.7–68.9 weight percent n-C$_3$F$_7$—OCH$_3$ and 31.1–33.3 weight percent methyl formate and having a boiling point of 24.9° C.±1° C. at a pressure of 728.7 mm Hg;

(H) a composition consisting essentially of 99.0–99.5 weight percent n-C$_3$F$_7$—OCH$_3$ and 0.5–1.0 weight percent acetone and having a boiling point of 33.5° C.±1° C. at a pressure of 728.5 mm Hg;

(I) a composition consisting essentially of 95.8–96.2 weight percent n-C$_3$F$_7$—OCH$_3$ and 3.8–4.2 weight percent methanol and having a boiling point of 29.0° C.±1° C. at a pressure of 728.5 mm Hg;

(J) a composition consisting essentially of 97.1–97.5 weight percent n-C$_3$F$_7$—OCH$_3$ and 2.5–2.9 weight percent 1,1,1,3,3,3-hexafluoro-2-propanol and having a boiling point of 33.4° C.±1° C. at a pressure of 733.2 mm Hg;

(K) a composition consisting essentially of 73.0–75.6 weight percent n-C$_3$F$_7$—OCH$_3$ and 24.4–27.0 weight percent methylene chloride and having a boiling point of 26.0° C.±1° C. at a pressure of 733.2 mm Hg; and (L) a composition consisting essentially of 50.0–92.0 weight percent n-C$_3$F$_7$—OCH$_3$ and 8.0–50.0 weight percent trans-1,2-dichloroethylene and having a boiling point of 29.5° C.±1° C. at a pressure of 736.0 mm Hg.

It has further been found that the hydrofluorocarbon ether in connection with this invention is capable of forming ternary azeotropic compositions having a second and third component. The second component can be selected from methanol and 1,1,1,3,3,3-hexafluoro-2-propanol and the third component can be selected from the group consisting of methylene chloride and trans-1,2-dichloroethylene.

Particular ternary azeotropic compositions in connection with the present invention include:

(A) a composition consisting essentially of 74.3–82.3 weight percent n-C$_3$F$_7$—OCH$_3$, 2.3–2.6 weight percent methanol and 17.3–21.3 weight percent trans-1,2dichloroethylene and having a boiling point of 26.8° C.±1° C. at a pressure of 731.7 mm Hg;

(B) a composition consisting essentially of 70.3–77.7 weight percent n-C$_3$F$_7$—OCH$_3$, 3.5–3.9 weight percent 1,1,1,3,3,3-hexafluoro-2-propanol and 21.0–23.0 weight percent trans-1,2-dichloroethylene and having a boiling point of 29.5° C.±1° C. at a pressure of 730.2 mm Hg;

(C) a composition consisting essentially of 70.0–76.6 weight percent n-C$_3$F$_7$—OCH$_3$, 1.9–2.1 weight percent methanol and 23.4–25.8 weight percent dichloromethane and having a boiling point of 24.6° C.±1° C. at a pressure of 733.7 mm Hg; and (D) a composition consisting essentially of 67.8–74.8 weight percent n-C$_3$F$_7$—OCH$_3$, 2.5–2.7 weight percent 1,1,1,3,3,3-hexafluoro-2-propanol and 24.8–27.4 weight percent dichloromethane and having a boiling point of 26.3° C.±1° C. at a pressure of 733.8 mm Hg.

Preferably, the azeotropic compositions are homogeneous. That is, they form a single phase under ambient conditions, i.e., at room temperature and atmospheric pressure.

The azeotropic compositions are prepared by mixing the desired amounts of hydrofluorocarbon ether, organic solvent and any other minor components such as surfactants together using conventional mixing means.

A cleaning process in accordance with this invention can be carried out by contacting a contaminated substrate with one of the azeotropic compositions of this invention until the contaminants on the substrate are dissolved, dispersed or displaced in or by the azeotropic composition and then removing (for example by rinsing the substrate with fresh, uncontaminated azeotropic composition or by removing a substrate immersed in an azeotropic composition from the bath and permitting the contaminated azeotropic composition to flow off of the substrate) the azeotropic composition containing the dissolved, dispersed, or displaced contaminant from the substrate. The azeotropic composition can be used in either the vapor or the liquid state (or both), and any of the known techniques for "contacting" a substrate can be utilized. For example, the liquid azeotropic composition can be sprayed or brushed onto the substrate, the vaporous azeotropic composition can be blown across the substrate, or the substrate can be immersed in either a vaporous or a liquid azeotropic composition. Elevated temperatures, ultrasonic energy, and/or agitation can be used to facilitate the cleaning. Various different solvent cleaning techniques are described by B. N. Ellis in *Cleaning and Contamination of Electronics Components and Assemblies*, Electrochemical Publications Limited, Ayr, Scotland, pages 182–94 (1986).

Both organic and inorganic substrates can be cleaned by the process of the invention. Representative examples of the substrates include metals; ceramics; glass; polymers such as: polycarbonate, polystyrene and acrylonitrile-butadiene-styrene copolymer; natural fibers (and fabrics derived therefrom) such as: cotton, silk, linen, wool, ramie; fur; leather and suede; synthetic fibers (and fabrics derived therefrom) such as: polyester, rayon, acrylics, nylon, polyolefin, acetates, triacetates and blends thereof; fabrics comprising a blend of natural and synthetic fibers; and composites of the foregoing materials. The process is especially useful in the precision cleaning of electronic components (e.g., circuit boards), optical or magnetic media, and medical devices and medical articles such as syringes, surgical equipment, implantable devices and prostheses.

The cleaning process of the invention can be used to dissolve or remove most contaminants from the surface of a substrate. For example, materials such as light hydrocarbon contaminants; higher molecular weight hydrocarbon contaminants such as mineral oils, greases, cutting and stamping oils and waxes; fluorocarbon contaminants such as perfluoropolyethers, bromotrifluoroethylene oligomers (gyroscope fluids), and chlorotrifluoroethylene oligomers (hydraulic fluids, lubricants); silicone oils and greases; solder fluxes; particulates; and other contaminants encountered in precision, electronic, metal, and medical device cleaning can be removed. The process is particularly useful for the removal of hydrocarbon contaminants (especially, light hydrocarbon oils), fluorocarbon contaminants, particulates, and water (as described in the next paragraph).

To displace or remove water from substrate surfaces, the cleaning process of the invention can be carried out as described in U.S. Pat. No. 5,125,978 (Flynn et al.) by contacting the surface of an article with an azeotropic composition which preferably contains a non-ionic fluoroaliphatic surface active agent. The wet article is immersed in the liquid azeotropic composition and agitated therein, the displaced water is separated from the azeotropic composition, and the resulting water-free article is removed from the liquid azeotropic composition. Further description of the process and the articles which can be treated are found in said U.S. Pat. No. 5,125,978 and the process can also be carried out as described in U.S. Pat. No. 3,903,012 (Brandreth).

Cleaning using an azeotropic composition in connection with the present invention may be carried by spraying using a spray comprising an azeotropic composition in connection with the present invention.

The azeotropic compositions can also be used in coating deposition applications, where the azeotropic composition functions as a carrier for a coating material to enable deposition of the material on the surface of a substrate. The invention thus also provides a coating composition comprising the azeotropic composition and a process for depositing a coating on a substrate surface using the azeotropic composition. The process comprises the step of applying to at least a portion of at least one surface of a substrate a coating of a liquid coating composition comprising (a) an azeotropic composition, and (b) at least one coating material which is soluble or dispersible in the azeotropic composition. The coating composition can further comprise one or more additives (e.g., surfactants, coloring agents, stabilizers, antioxidants, flame retardants, and the like). Preferably, the process further comprises the step of removing the azeotropic composition from the deposited coating by, e.g., allowing evaporation (which can be aided by the application of, e.g., heat or vacuum).

The coating materials which can be deposited by the process include pigments, lubricants, stabilizers, adhesives, anti-oxidants, dyes, polymers, pharmaceuticals, release agents, inorganic oxides, and the like, and combinations thereof. Preferred materials include perfluoropolyether, hydrocarbon, and silicone lubricants; amorphous copolymers of tetrafluoroethylene; polytetrafluoroethylene; and combinations thereof. Representative examples of materials suitable for use in the process include titanium dioxide, iron oxides, magnesium oxide, perfluoropolyethers, polysiloxanes, stearic acid, acrylic adhesives, polytetrafluoroethylene, amorphous copolymers of tetrafluoroethylene, and combinations thereof. Any of the substrates described above (for cleaning applications) can be coated via the process of the invention. The process can be particularly useful for coating magnetic hard disks or electrical connectors with perfluoropolyether lubricants or medical devices with silicone lubricants.

The deposition process of the invention can be carried out by applying the coating composition to a substrate by any conventional technique. For example, the composition can be brushed or sprayed (e.g., as an aerosol) onto the substrate, or the substrate can be spin-coated. Preferably, the substrate is coated by immersion in the composition. Immersion can be carried out at any suitable temperature and can be maintained for any convenient length of time. If the substrate is a tubing, such as a catheter, and it is desired to ensure that the composition coats the lumen wall, it may be advantageous to draw the composition into the lumen by the application of reduced pressure.

After a coating is applied to a substrate, the azeotropic composition can be removed from the deposited coating by evaporation. If desired, the rate of evaporation can be accelerated by application of reduced pressure or mild heat. The coating can be of any convenient thickness, and, in practice, the thickness will be determined by such factors as the viscosity of the coating material, the temperature at which the coating is applied, and the rate of withdrawal (if immersion is utilized).

In addition to coating compositions, the present invention also provides other compositions comprising an azeotropic composition, such as e.g. refrigerant composition that may include a lubricant. To form a (coating) composition, the components of the composition (i.e., the azeotropic composition, additional material(s), and any additive(s) utilized) can be combined by any conventional mixing technique used for dissolving, dispersing, or emulsifying the components, e.g., by mechanical agitation, ultrasonic agitation, manual agitation, and the like. The azeotropic composition and the additional material(s) can be combined in any ratio depending upon the particular application but for coating application the added coating material(s) preferably constitute from about 0.1 to about 10 weight percent of the coating composition for most coating applications.

This invention also includes the use of the above described azeotropes as refrigerants for cooling an object or area. In particular, a process is provided that comprises the steps of condensing the refrigerant, then evaporating the refrigerant in the vicinity of the object to be cooled. The process can be carried out in equipment employing the standard refrigeration cycle, which would generally include a compressor for pressurizing the refrigerant in its vapor phase, a condenser for condensing the refrigerant, an expansion valve for reducing the pressure of the liquid refrigerant, and an evaporator in which the refrigerant returns to the vapor phase. The phase transformation at the evaporator causes the refrigerant to absorb heat from its surroundings, thus having the effect of cooling the immediate vicinity. It is understood, however, that the azeotropes in accordance with this invention can be suitable for use in any refrigeration operation which currently uses known CFC in particular those that use CFC-11 or CFC-113. Modification to the standard refrigeration system may be needed and include the presence of one or more heat exchangers in addition to the evaporator and condenser. Examples of equipment in which the azeotropic composition in accordance with this invention may be useful include, but not limited to: centrifugal chillers, household refrigerator/freezers, automotive air conditioners, refrigerated transport vehicles, heat pumps, supermarket food coolers and display cases and cold storage warehouses.

The process described above can also be used to heat an object in the vicinity of an azeotropic composition as it condenses. During the condensation step, the azeotropic composition transfers heat to its surroundings, thus warming the immediate vicinity. As above it is understood that use of this process is not limited to equipment employing the standard refrigeration cycle; the process is suitable for use on any heating apparatus that uses CFCs and may be in particular suitable for those heating apparatus that use CFC-11 or CFC-113.

The present invention is further illustrated by means of the following examples without however the intention to limit the invention thereto.

EXAMPLES

Preparation of 1-Methoxyperfluoro-n-Propane

Perfluoropropionyl fluoride was prepared by the electrochemical fluorination of propionyl chloride using the standard Simons electrochemical fluorination. The total cell product was collected in a Dry Ice condenser and further cooled in a Dry Ice chest. Hydrogen fluoride was removed as a separate liquid phase from the cell drainings. The crude perfluropropionyl fluoride was transferred to a stainless steel cylinder to minimize hydrolysis and the facilitate further manipulations. Analysis by $^{19}$F NMR average analysis of 77.4% $C_2F_5COF$. Analysis by $_1$H and $^{19}$F NMR gave an average value for 0.72% residual HF.

Into a previously dried 2 gallon Paar™ stainless steel stirred autoclave was placed anhydrous potassium fluoride (191.8 g, 3.3 moles). The autoclave was evacuated with the aid of a vacuum pump to an internal pressure of less than 10 torr. A mixture of anhydrous diglyme (1287 g) and triethylamine (23.4 g, 0.23 mole) was charged into the evacuated autoclave through a dip tube. A portable refrigeration unit was attached to the cooling ports of the autoclave. When the internal temperature of the stirred autoclave reached −20° C., the perfluoropropionyl fluoride mixture (643.5 g, 3.0 moles, described above) was charged to the cooled and evacuated. After the acyl fluoride was charged, the reaction mixture was allowed to warm to about 0° C. Dimethyl sulfate (438.4 g, 3.48 moles) was added to the chilled mixture through the charge port using another steel cylinder which had been previously dried and evacuated.

The cooled reaction mixture was allowed to warm to ambient temperature whereby a slight exothermic reaction ensued with a temperature rise to 29° C. The mixture was stirred overnight at ambient temperature. Water (200 g) and potassium hydroxide (200 g of 45 wt. %) was added to the reactor. The internal temperature rose to 35° C. after the aqueous base was added. The mixture was stirred to facilitate the hydrolysis of any excess dimethyl sulfate. External cooling was applied to the reactor in order to reduce product loss during the one plate distillation and recovery process from the reactor. The crude product (550 g) was collected in a chilled condensing system by allowing the product vapors to escape the stainless steel reactor. The reactor was gradually heated to 50° C. to facilitate product removal.

GLC analysis showed the product to be composed of some unidentified low boiling materials (5%) along with the desired product (90%) and some higher boiling hydride containing hydrofluoroethers. Fractional distillation through a 50 plate Oldershalk column provided 1-methoxyperfluoropropane(500 g), bp 33° C., with an assay greater than 99.8% by GLC analysis. Structural verification was done using $^{19}$F NMR.

Test Methods

Characterization of the Azeotropic Compositions by the Distillation method.

Mixtures of hydrofluorocarbon ether and a second component and optionally third component were prepared and distilled in a concentric tube distillation column (Model 9333 from Ace Glass, Vineland N.J.). The distillation was allowed to equilibrate at total reflux for at least 60 minutes. In each distillation, six successive distillate samples, each approximately 5 percent by volume of the total liquid charge, were taken while operating the column at a liquid reflux ratio of 20 to 1. The compositions of the distillate samples were then analyzed using an HP-5890 Series II Plus Gas Chromatograph with a 30 m HP-5 capillary column (cross-linked 5% phenyl methyl silicone gum stationary phase), a NUKOL™ (fused silica) capillary column or a Stabilwax™—crossbond Carbowax™—polyethylene glycol column and a flame ionization detector. The boiling points of the distillate were measured using a thermocouple which was accurate to about 1° C.

An azeotrope is detected if the boiling point is below either component and a substantially constant composition in the distillate is found when 20 to 30% of the total amount charged was collected.

The compositional data, boiling points and ambient pressures at which the boiling points were measured are reported in Table 2 for the binary azeotropes and in Table 3 for the ternary azeotropes.

Flammability of the Azeotropes

The azeotropes were also tested for flammability by placing a small aliquot of the azeotrope in an open aluminum dish and holding a flame source in contact with the vapor of the azeotrope above the dish. Flame propagation across the vapor indicated that the azeotrope was flammable. The flammability data is presented in Table 2 and 3 under the heading "Flam."

Ability to Dissolve Hydrocarbons

The azeotropic compositions were tested for their ability to dissolve hydrocarbons of increasing molecular weight in a manner similar to the procedure described in U.S. Pat. No. 5,275,669 (Van Der Puy et al.) The data presented in Table 2 and 3 was obtained by determining the largest normal hydrocarbon alkane which was soluble in a particular azeotropic composition at a level of 50 volume percent. The hydrocarbon solubilities in the azeotropic compositions were measured at room temperature. The numbers in Table 4 under the headings "HC@RT" correspond to the number of carbon atoms in the largest hydrocarbon n-alkane that was soluble in each of the azeotropic compositions at room temperature.

TABLE 2

| | Binary azeotropes | | | | |
|---|---|---|---|---|---|
| Second Component | Comp. wt %[1] (stand. Dev.) | Flam. | B.P. ° C. | Pressure[2] (torr) | HC @ RT |
| Alkanes | | | | | |
| Pentane | 29.5 (0.4) | Yes | 24.8 | 735.8 | 15 |
| 2,2-Dimethlbutane | 17.0 (0.2) | Yes | 30.6 | 735.6 | 13 |
| Hexane | 3.7 (0.1) | Yes | 32.7 | 729.6 | 9 |

TABLE 2-continued

Binary azeotropes

| Second Component | Comp. wt %[1] (stand. Dev.) | Flam. | B.P. °C. | Pressure[2] (torr) | HC @ RT |
|---|---|---|---|---|---|
| Methylcyclopentane | 4.0 (0.2) | No | 32.9 | 729.5 | 10 |
| Cyclohexane | 2.4 (0.1) | No | 33.3 | 735.8 | 9 |
| Heptane | 0.4 (0.1) | No | 33.4 | 729.3 | 10 |
| Esters | | | | | |
| Methyl Formate | 32.7 (0.3) | Yes | 24.9 | 728.7 | 14 |
| Ketones | | | | | |
| Acetone | 0.8 (0.1) | No | 33.4 | 728.5 | 10 |
| Alcohols | | | | | |
| Methanol | 4.0 (0.1) | Yes | 29.0 | 728.5 | 9 |
| Hexafluoro-2-propanol | 2.7 (0.1) | No | 33.4 | 733.2 | 10 |
| Chloroalkanes | | | | | |
| Methylene Chloride | 25.7 (0.1) | No | 26.0 | 733.2 | 14 |
| Chloroalkenes | | | | | |
| t-1,2-dichloroethylene | 22.4 (0.1) | No | 29.5 | 736.0 | 12 |

[1] average amount of second component in the azeotrope
[2] pressure at boiling point in torr

TABLE 3

Ternary Azeotropes

| Second and third component | Comp. wt %[1] (stand. dev.) | BP (°C.) | Pressure[2] | Flam. | HC @ RT |
|---|---|---|---|---|---|
| Composition T1 | | | | | |
| trans-dichloroethylene | 19.3 (0.1) | 26.8 | 731.7 | Yes | 12 |
| methanol | 2.5 (0.1) | | | | |
| Composition T2 | | | | | |
| trans-dichloroethylene | 22.2 (0.4) | 29.5 | 730.2 | No | 11 |
| hexafluoro-2-propanol | 3.7 (1.7) | | | | |
| Composition T3 | | | | | |
| methylene chloride | 24.6 (0.1) | 24.6 | 733.7 | No | 14 |
| methanol | 2.0 (0.1) | | | | |
| Composition T4 | | | | | |
| methylene chloride | 26.1 (0.4) | 26.3 | 733.8 | No | 13 |
| hexafluoro-2-propanol | 2.6 (0.1) | | | | |

[1] average amounts of second and third component in the azeotrope
[2] pressure at boiling point in torr Vapor-Liquid Equilibrium Data For Hydrofluorocarbon Ether/trans-1,2,-Dichloroethylene System The vapor-liquid equilibrium (VLE) data collected and presented in FIG. 1 were collected according to the following method. A continuous equilibrium still comprising a 1.0 liter insulated distilling flask, a heating mantel, an overhead condenser, a receiving flask, and two thermocouples positioned to measure the vapor temperature and the temperature of the liquid in the distilling flask was charged with approximately 200 mL of trans-1,2, -dichloroethylene. The trans-1,2,-dichloroethylene was heated to boil and allowed to equilibrate at total reflux for at least 60 minutes under atmospheric pressure at which time the liquid and vapor temperatures were recorded. Successive additions of approximately 10 mL of hydrofluorocarbon were added to the distillation flask and allowed similarly to equilibrate. Upon equilibration after each successive addition, the liquid and vapor temperatures were again recorded and liquid samples were extracted from the distillation and receiving flasks and their respective compositions were analyzed using an HP-5890 Series II Plus Gas Chromatograph equipped with a 30 m HP-5 capillary column (cross-linked 5% phenyl methyl silicone gum stationary phase) and a flame ionization detector. The process of addition was continued until the proportion of the hydrofluorocarbon ether in the distillate flask reached about fifty percent by volume. The distillation still then was emptied, filled with approximately 200 mL of hydrofluorocarbon ether, and the above process was repeated by successive addition of approximately 10 mL of trans-1,2, dichloroethylene.

Evaluation of Hydrofluorocarbon Ether/trans-1,2,-Dichloroethylene Azeotrope as a Refrigerant The ability of an azeotrope of the hydrofluorocarbon ether and trans-1,2,-dichloroethylene (22 wt % trans-1 ,2,- dichloroethylene) to function as a refrigerant was evaluated from prediction of the thermodynamic properties of the azeotrope using the four parameter corresponding states method described in W.V. Wilding et al., "Thermodynamic Properties and Vapor Pressures of Polar Fluids From a Four-Parameter Corresponding States Method," Int. J. Thermophysics, Vol. 8(6), 1987. The method employed the following measured vapor pressure, critical point, and liquid density data:

| | |
|---|---|
| Boiling Point (K) | 302.6 |
| $T_c$ (K) | 449.1 |
| $P_c$ (K) | 31.42 |
| Liq. Density @ 23° C. (g/cc) | 1.355 |

Isentropic cycle performance at typical chiller conditions then was predicted from these data. Table 4 below presents the results.

TABLE 4

| Property | CFC-11 | HCFC-123 | Azeotrope |
|---|---|---|---|
| Tip Speed (m/s) | 191 | 185 | 177 |
| Volumetric Capacity (kJ/kg) | 474.5 | 406.1 | 402.9 |
| COP | 7.16 | 7.05 | 7.40 |
| Mach Number | 1.44 | 1.51 | 1.44 |
| $P_{evaporation}$ (kPa) | 49.7 | 41.0 | 40.4 |
| $P_{condenser}$ (kPa) | 174.8 | 154.0 | 143.9 |

The predicted thermodynamic properties of the three refrigerant materials compared in Table 4 provide evidence that an azeotropic composition of the hydrofluorocarbon ether and trans-1,2-dichloroethylene can function as a replacement for currently employed CFC and HCFC refrigerants. The tip speed of the azeotrope is very similar to that of both comparison refrigerants. This number is a measure of the tangential velocity the impeller must have to develop the pressure difference required to span the temperature difference between evaporator and condenser. If the required tip speed for the azeotrope was larger than that for CFC-11 or HCFC-123, an existing compressor might not be able to develop the head required for normal operation. This is a condition called surge and it halts compressor operation. Should a new impeller be necessary, the fact that the tip speed is lower for the azeotrope guarantees that 100% of CFC-11 or HCFC-123 compressors can be retrofitted. If the tip speed was higher, a larger impeller would be required and that impeller might not fit in the existing impeller housing.

The volumetric capacity of the azeotrope is very similar to that of HCFC-123 indicating that the azeotrope might function as a drop-in in machines operating with that refrigerant. The volumetric capacity of the azeotrope is sufficiently similar to that of CFC-11 that it might function very well with redesigned impellers.

The theoretical COP of the azeotrope is higher than that of CFC-11 and HCFC-123 indicating that machines designed for this refrigerant might exhibit better performance than would be possible with either of the others. At a time when energy efficiency is a marketable feature of a new system, this could well make the azeotrope highly effective and desirable.

Finally, the Mach number of the azeotrope at operating and design conditions indicates that the compressor can develop the required head without a choked flow condition developing.

Various modifications and alterations of this invention will be apparent to those skilled in the art without departing from the scope and spirit of this invention, and it should be understood that this invention is not limited to the illustrative embodiments set forth herein.

We claim:

1. An azeotropic composition consisting essentially of 50.0–92.0 weight percent n-$C_3F_7$—$OCH_3$ and 8.0–50.0 weight percent trans-1,2-dichloroethylene and having a boiling point of 29.5° C.±1° C. at a pressure of 736.0 mm Hg.

2. The azeotropic composition of claim 1 consisting essentially of 77.6±0.1 weight percent n-$C_3F_7$—$OCH_3$ and 22.4±0.1 weight percent trans-1,2-dichloroethylene and having a boiling point of 29.5° C.±1° C. at a pressure of 736.0 mm Hg.

3. A process for producing refrigeration which comprises evaporating an azeotropic composition as defined in claim 1 in the vicinity of a body to be cooled.

4. A process for producing heat which comprises condensing an azeotropic composition as defined in claim 1 in the vicinity of a body to be heated.

5. A process for transferring heat comprising the steps of:

providing a heat source;

providing a heat sink; and transferring heat between the heat source and the heat sink through the use of a heat transfer medium comprising an azeotropic composition as defined in claim 1.

6. A process for cleaning a solid surface which comprises treating said solid surface with an azeotropic composition as defined in claim 1.

7. A process according to claim 6 wherein said solid surface is a printed circuit board contaminated with flux and flux residues.

8. A process for depositing a coating on a substrate surface comprising the steps of applying to said substrate surface a liquid coating composition comprising an azeotropic mixture as defined in claim 1 and a coating material that is soluble or dispersible in said azeotropic composition.

* * * * *